United States Patent [19]

Kleider et al.

[11] Patent Number: 5,681,214

[45] Date of Patent: Oct. 28, 1997

[54] HAND POWER TOOL

[75] Inventors: Albert Kleider, Schwaebisch Hall; Dieter Butz, Kirchheim, both of Germany

[73] Assignee: Robert Bosch GmbH, Stuttgart, Germany

[21] Appl. No.: 744,088

[22] Filed: Nov. 5, 1996

[30] Foreign Application Priority Data

Dec. 12, 1995 [DE] Germany ................ 195 46 328.5

[51] Int. Cl.$^6$ ........................................... B24B 23/02
[52] U.S. Cl. ................ 451/358; 451/359; 451/344; 451/360
[58] Field of Search ...................... 451/342, 344, 451/354, 358, 359, 360, 363; 30/517, 518; 173/170

[56] References Cited

U.S. PATENT DOCUMENTS

| | | | |
|---|---|---|---|
| 4,785,540 | 11/1988 | Arvidsson | 30/514 |
| 5,065,476 | 11/1991 | Dohse et al. | 30/383 |
| 5,201,146 | 4/1993 | Fushiya | 451/358 |
| 5,339,572 | 8/1994 | Eicher | 451/358 |
| 5,407,381 | 4/1995 | Schaefer et al. | 451/358 |
| 5,466,183 | 11/1995 | Kim et al. | 451/358 |

FOREIGN PATENT DOCUMENTS

4102838A1  6/1992  Germany.

*Primary Examiner*—Eileen P. Morgan
*Attorney, Agent, or Firm*—Michael J. Striker

[57] ABSTRACT

A hand power tool formed as a hand-guided angular grinder has a tool, and an electric-motor drive for the tool, a housing accommodating the drive and carrying a central bearing pin, a handle composed of two semi-shells, rotatably arranged on the bearing pin, overlapping an end side of the motor housing and having a switch strip, an electrical switch actuated by the switch strip and connected with the drive, and a fixing device for fixing the handle in at least two different positions in a relative rotation to the motor housing and having a manual actuating member arranged on the handle, each of the handle shells being provided with a bearing semi-shell formed on the handle shell and rotatably arranged on the bearing pin, the bearing pin being provided at an end side with a blind hole, and a sleeve is inserted in the blind hole, provided with a radial flange overlapping concentric ends of the bearing pin and the bearing semi-shells, and having a snapping hook located at an end which is remote from the flange and arrested in radial recesses in the bearing pin.

13 Claims, 5 Drawing Sheets

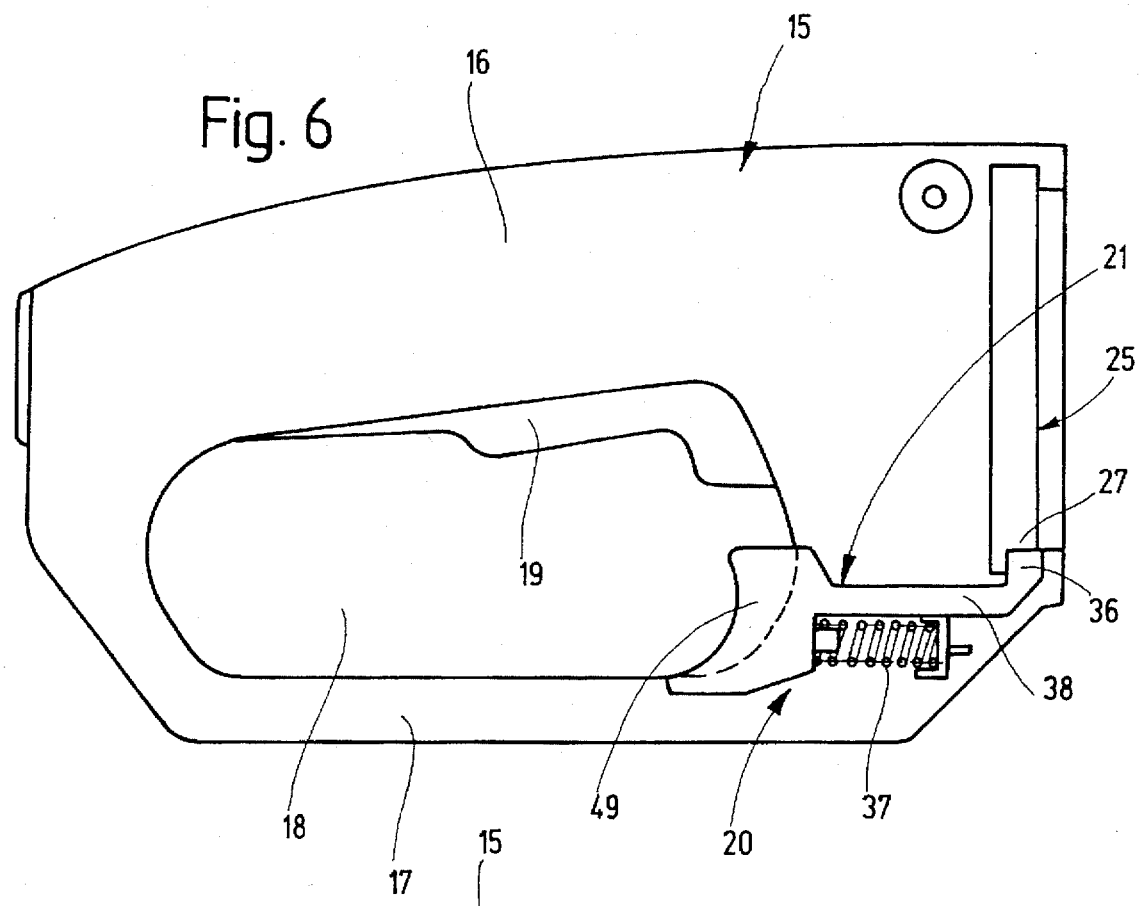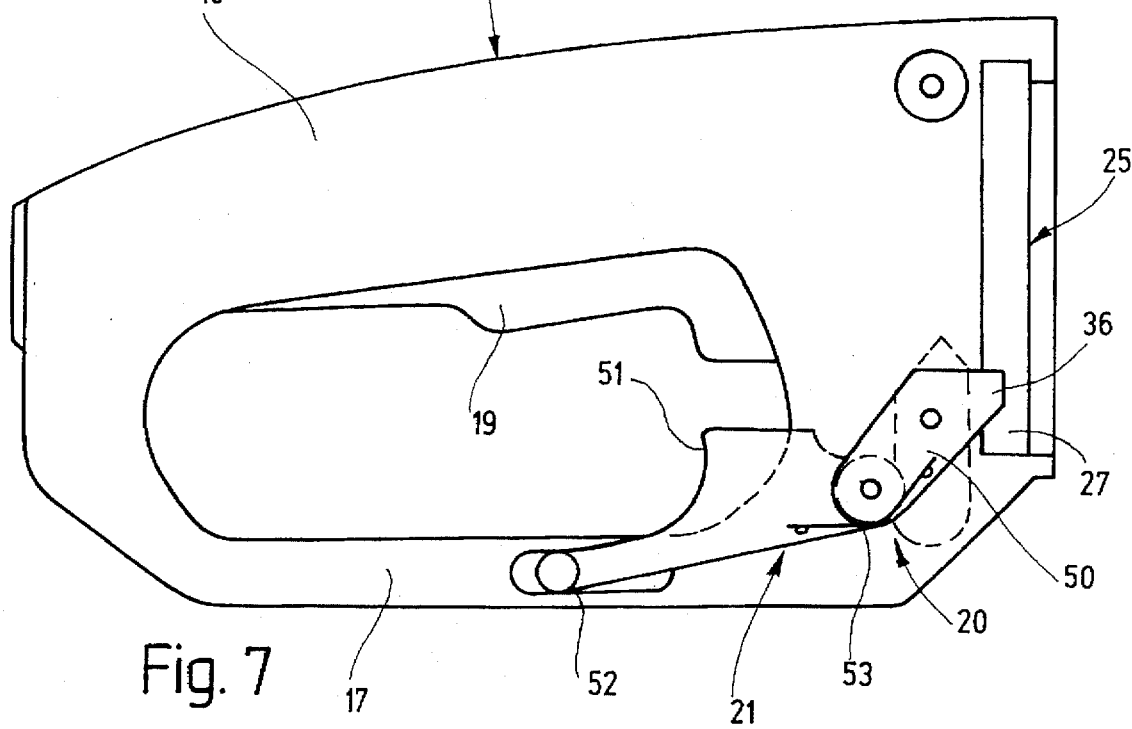

HAND POWER TOOL

BACKGROUND OF THE INVENTION

The present invention relates to hand power tools. More particularly, it relates to a hand power tool formed as an angular grinder.

Hand power tools of the above mentioned general type provide for an ergonomical holding of the device in each of different working positions by a relative turning between the motor housing and the handle. For example, the angular grinder must perform scrapping and grinding with the grinding disk facing downwardly or in other words parallel to a switch strip on the handle, or separation of stone plates with the separating disk located perpendicular to the tool and therefore perpendicular to the switch strip. In the latter case, the separating disk can be fixed to be located right or left from the handle.

Such a turning of the handle relative to the motor housing is realized for example in the hand power tool disclosed in the German patent document DE 41 02 838 A1. In the construction disclosed in this reference a ring collar of a rotary cross is axially non-displaceably received on the bearing pin formed centrally on the motor housing and fixedly connected with the handle composed of two semi-shells by two screws which hold together the handle shells. The ring collar is supported with its end sides against a ring shoulder of the bearing pin through a sliding disk and is fixed at its other side by a clamping plate. The clamping plate is screwed by two screws to the free end side of the bearing pin, and a plate spring is located between the clamping plate and the ring collar. The fixing device has three rib pairs which are formed on the motor housing and offset relative to one another by 90°. Their both ribs are arranged in parallel and at a distance from one another and extend radially, and the actuating member turnably supported on the rotary cross can engage with a locking cam in the rib pair with a lateral form-locking connection.

SUMMARY OF THE INVENTION

Accordingly, it is an object of the present invention to provide a hand power tool of the above mention general type, which is a further improvement of the existing tools.

In keeping with these objects and with others which will become apparent hereinafter, one feature of the present invention resides, briefly stated, in a hand power tool in which a bearing semi-shell which is rotatably arranged on the bearing pin is formed on each handle shell, the bearing pin is provided at its end side with a blind hole, and a sleeve is inserted in the blind hole, the sleeve with its end-side radial flange engages at the concentric ends of the bearing pin and the bearing semi-shell and is arrested with a snap hook formed at the flange-spaced end in the radial recesses of the bearing pin.

When the hand power tool is designed in accordance with the present invention, it has the advantage that the relative turning of the handle and the motor housing is provided by a structurally simple construction. The bearing semi-shells are formed simultaneously during the injection molding process from the handle shells produced conventionally of plastic. The axial displaceability of the bearing pin and pins and the bearing shells is provided by a synthetic plastic sleeve which must be clamped, however in the blind hole. Individual parts, such as the rotary cross, the sliding disk, the clamping plate, the plate spring and two mounting screws are dispensed with. During assembly of the hand power tool, only single part, namely the synthetic plastic sleeve must be mounted for connecting the motor housing with the handle, and in particular before screwing of both handle shells with one another. In addition to saving of many individual parts, also the mounting time is considerably reduced.

In accordance with a preferable embodiment of the invention, a radial slot is provided in the bearing pin at an end side, so that it extends preferably to the base of the blind hole and opens into the blind hole. Electrical connecting cable between the electro-motor drive and the on/off switch passes through the radial slot and the sleeve, and is fixed on the bottom of the radial slot by a radial projection on the sleeve engaging in the radial slot. In such construction the cable passage through the bearing pin is very efficient. With clamping the sleeve for fixing of the bearing pin and the bearing shell, simultaneously the connecting cable guided centrally through the bearing pin and the sleeve in the handle is held down on the bottom of the blind hole and fixed there.

In accordance with a preferable embodiment of the invention, the fixing device has a locking projection which is movably held in the handle and coupled with the actuating member, and at least two recesses are formed in the motor housing for form-lockingly receiving the locking projections in the peripheral direction of the motor housing. They are offset in the peripheral direction preferably by the same turning angle. A spring force acts on the locking projections to load them in the recesses in engaging direction. With this construction an operational improvement of the hand power tool is provided, since the handle is automatically engaged into the recesses which are offset by the same turning angle and therefore is arrested there.

In accordance with a preferable embodiment of the invention, the actuating member is arranged in immediate proximity to the switch strip and provided with a blocking element which cooperates with the switch strips so that when the switch strip is brought to turning-on position, an actuation of the actuating member for turning the handle blocks a displacement of the switch strip from its switching off to its switching on position. With this construction a substantial contribution to the working safety is provided, since it reliably prevents unlocking of the handle with running electro-motor drive or vice versa switching-on of the electro-motor drive with unlocked handle.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 and 7 are side views of the angular grinder in accordance two further embodiments of the present invention.

DESCRIPTION OF PREFERRED EMBODIMENTS

Figure 1:
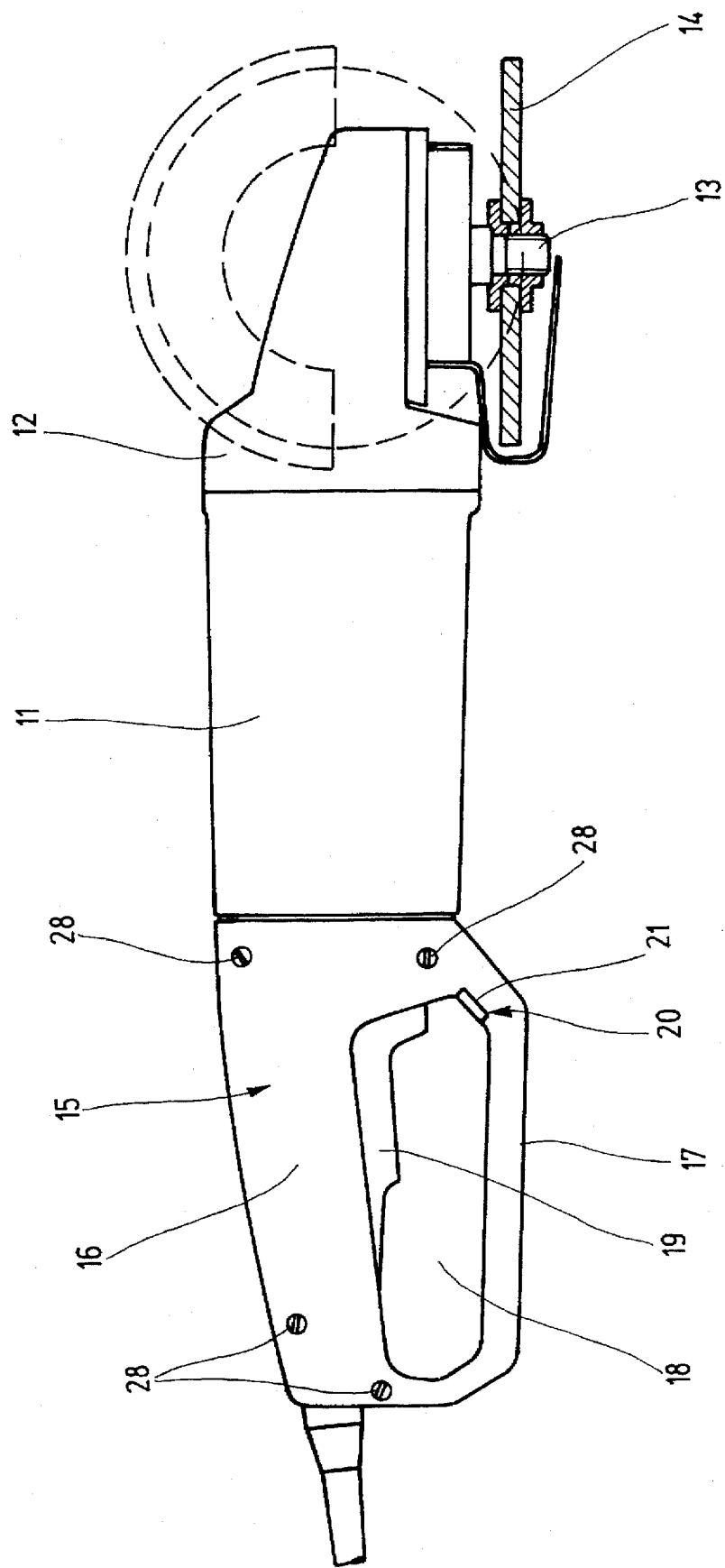
FIG. 1 is a side view of a hand-guided electrical angular grinder.

A hand power tool formed for example as a hand-guided electrical angular grinder is shown on a side view in FIG. 1 and has a motor housing 11 with a transmission head 12 mounted on its end side and provided with a drive spindle 13 for a grinding disk 14. A handle 15 is arranged on the other end side rotatably about an axis of the motor housing. The end side of the motor housing 11 is covered for protection from dust. The handle 15 is composed of a handle grip 16 which is surrounded by hand during operation with the angular grinder, and a bracket 17 formed one-piece with the grip and extending at the lower side of the latter so as to provide a handle opening 18. During operation with the angular grinder, the finger supported on the handle grip 16 is protected from below. A switch strip 19 is located on the lower side of the handle grip 16 facing the bracket 17 and extends in the handle opening 18. It actuates an on/off switch for an electric drive motor mounted in the motor housing 11.

The handle 15 which is rotatable on the motor housing 11 can be fixed in three different rotary positions by a fixing device 20. In the relative position of the motor housing 11 and the handle 15 shown in FIG. 1, the angular grinder is utilized for so called scrubbing or grinding. In this relative position the grinding disk 14 is located substantially parallel to the switch strip 19. From this scrubbing position, the angular grinder can be prepared for the separating operation by turning the handle 15 or the motor housing 11 by 90° to the left or to the right. In this working position of the angular grinder, the handle 15 maintains its position, and the motor housing 11 together with the transmission head 12 is turned by 90° so that the grinding disk 14 which is now the separating disk assumes a position shown in broken lines in FIG. 1. In this position it is oriented substantially perpendicular to the switch strip 19. The release of the fixing device 20 is performed by an actuating member 21. It is engageable near the switch strip 19 in the handle 15 or particularly in the handle grip 16 at the side of the handle opening 18 which faces the motor housing 11.

Figure 3:
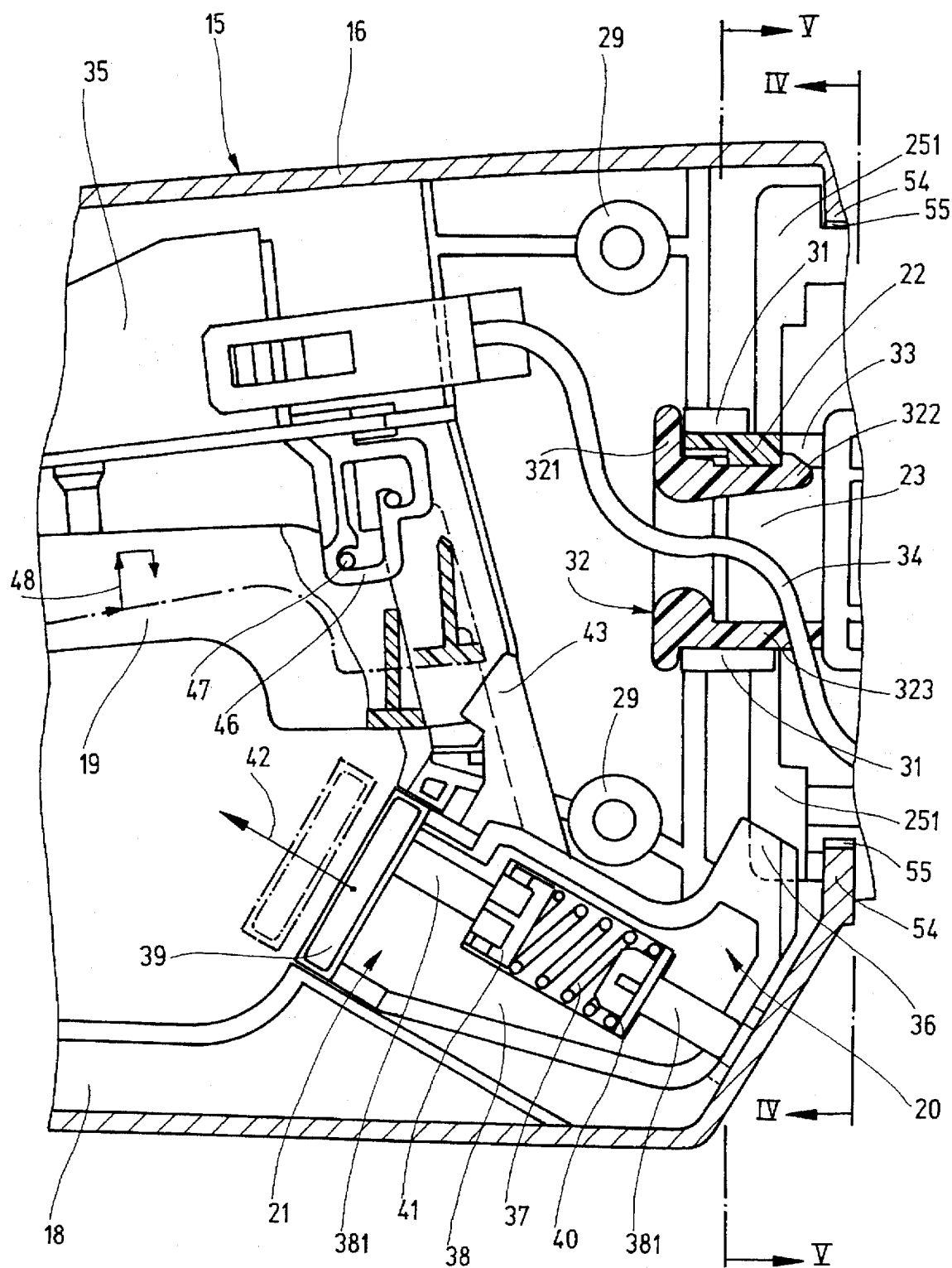
FIG. 3 is an enlarged view of a portion of the handle of FIG. 2.
Figure 4:
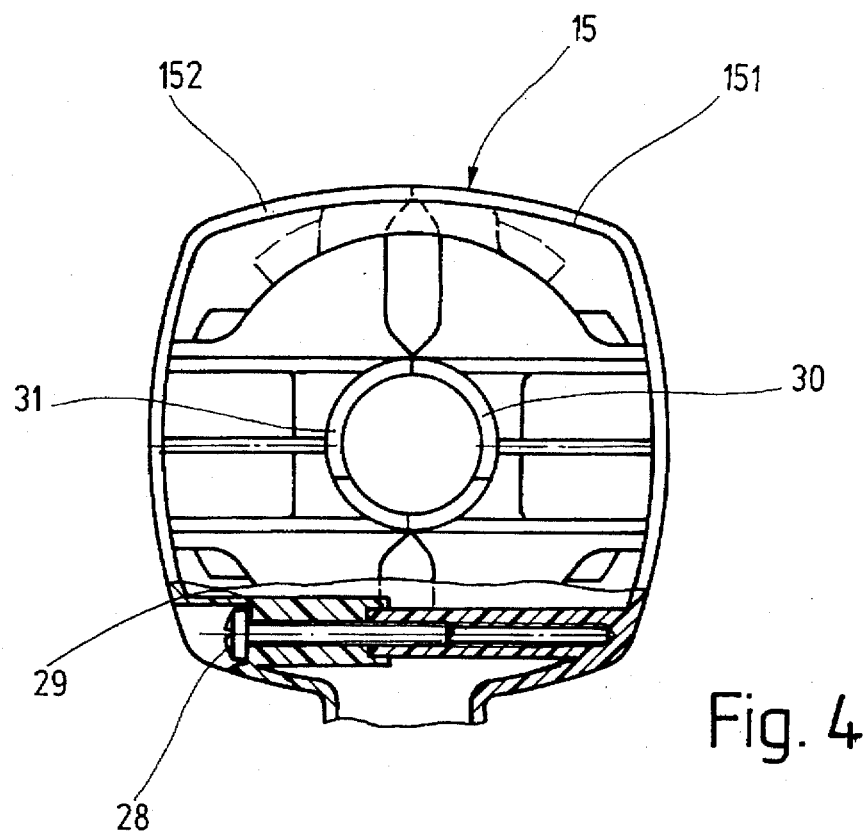
FIG. 4 is a view showing a section taken along the line IV—IV in FIG. 3.
Figure 5:
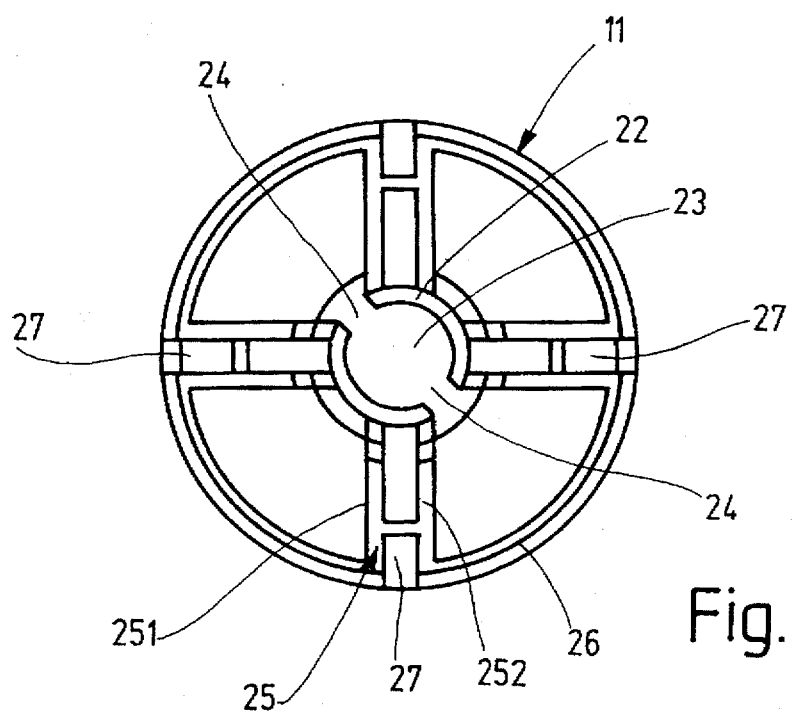
FIG. 5 is a view showing a section taken along the line V—V in FIG. 3.

Details of the fixing device 20 as well as the rotatable holding of the handle 15 on the motor housing 11 are shown in FIGS. 3–5. As can be seen from FIGS. 3 and 5, a central bearing pin 22 is formed on the motor housing 11 on its end side facing away from the transmission head 12. The bearing pin 22 is provided at the end side with a blind hole 23 as well as two diametrically opposite radial slots 24. The radial slots extend to the bottom of the blind hole and open in the blind hole 23. Four rib pairs 25 which are arranged offset relative to one another by 90° extend from the bearing pin 22 radially outwardly and are connected with one another through concentric ring segments 26. Each rib pair 25 has two ribs 251, 252 which extend parallel to and at a distance from one another to form a recess 27 which is a part of the fixing device 20. The axial height of the ribs 251, 252 and the ring segments 26 is identical.

As can be seen from FIG. 4, the handle 15 is assembled of two half handle shells 151 and 152. They are connected with one another by screws 28 extending transversely to the axis of the motor housing. The lower screw 28 can be seen in FIG. 4. The screws 28 are inserted in aligned transverse openings 29 in both handle shells 151, 152. Each handle shell 151, 152 engages with a collar 54 provided on its end into a circumferential groove 55 in the motor housing 11 as shown in FIG. 3. A bearing semi-shell 30, 31 is formed on each hand shell 151, 152 and is rotatably supported on the bearing pin 22 of the motor housing 1. A synthetic plastic sleeve 32 is inserted in the blind hole 23 for securing the bearing semi-shells 30, 31 from axial displacement of the bearing pin 22. The sleeve 32 has a radial flange 321 which is provided at the end side and engages the concentric ends of the bearing pin 22 and the bearing semi-shells 30, 31. It also has a snapping hook 322 formed of one-piece with the end removed from the flange and arrested in the radial recesses 33 in the bearing pin 22.

Moreover, the synthetic plastic sleeve 32 carries two diametrically opposite radial projections 323. When the synthetic plastic sleeve 32 is inserted in the blind hole 23, the projections 323 engage correspondingly in one of both radial slots 24 in the bearing pin 22. The projections 323 end at a distance before the bottom of the radial slot 24. An electrical connecting cable 34 extends through one of the radial slots 24 and the hollow interior of the synthetic plastic sleeve 32. It connects the electro-motor drive with the electrical on/off switch 35 which is actuated by the switch strip 19. The connecting cable 34 is fixed by the projection 323 of the synthetic plastic sleeve 32 on the bottom of the radial slot 24 and on the bottom of the blind hole 23.

Figure 2:
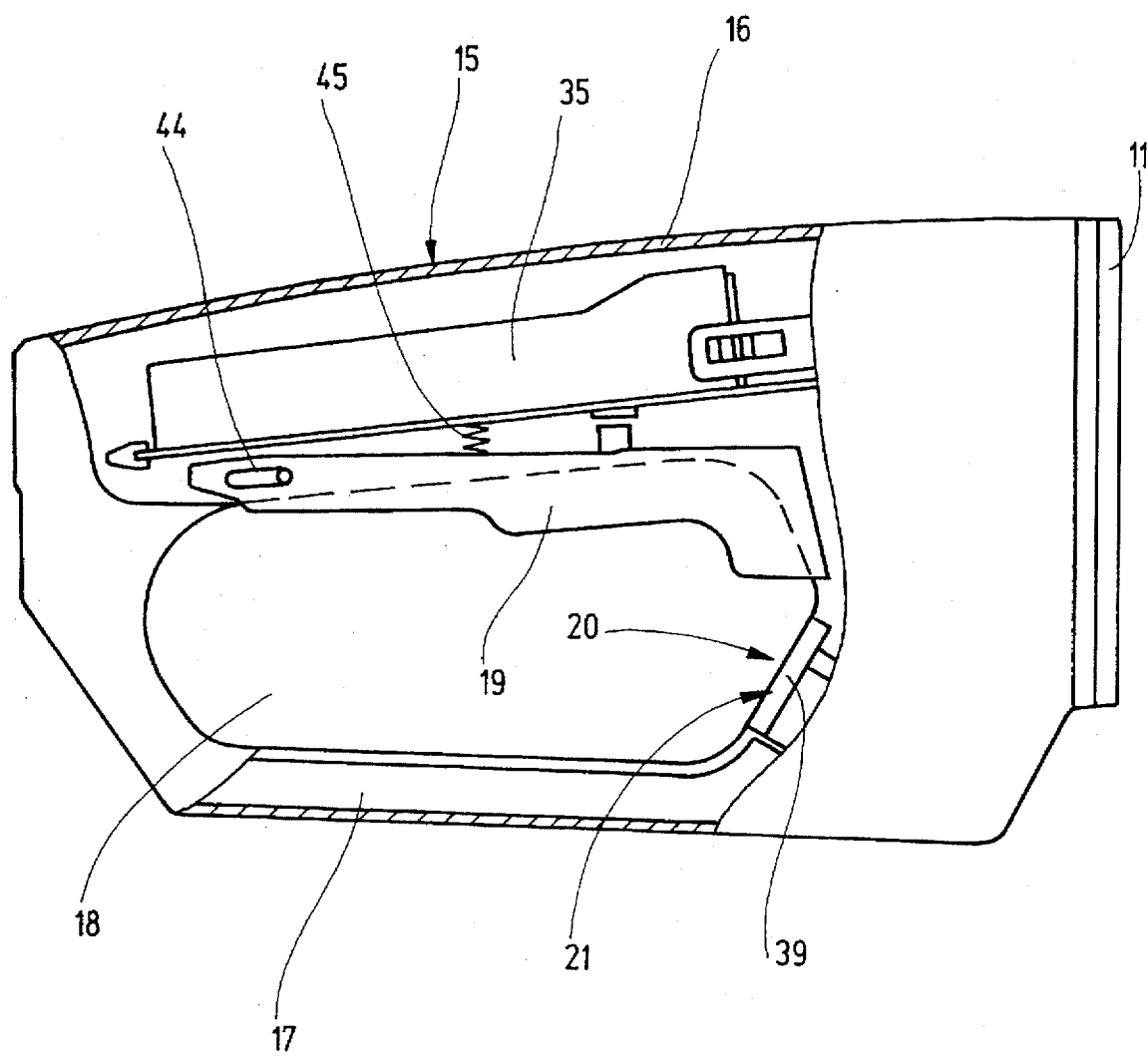
FIG. 2 is a side view of a handle of the angular grinder of FIG. 1 partially in sections.

As mentioned above, the fixing device 20 includes the actuating member 21 and three out of four recesses 27 formed by the rib pairs 25 in the motor housing 11. It also includes a locking projection 36 mounted on the actuating member 21 and insertable in the peripheral direction of the motor housing 11 in the recesses 27 in a form-locking manner, and a pressure spring 37 which loads the actuating member 21 so that the locking projections 36 are driven into the recesses 27 in the insertion direction. In the embodiment of FIGS. 1-3 the actuating member 21 is formed as a slider 38 which is guided in the handle 15 with lateral guides 381. The slider 38 is provided with the locking projection 36 on its rear end, and with a handle part or a gripping part 39 at its end extending outwardly beyond the handle 15 in the handle opening 18. The pressure spring 37 is supported at one end against the spring plate 40 fixed to the slider and on the other end against a spring plate 41 fixed to the handle. The gripping part 39 projects at both sides of the bracket 18 outwardly, so that it is ergonomically favorable to be engaged by a right-handed person and a left-handed person.

In the position of the fixing device 20 shown in FIG. 3, it holds the handle 15 non-rotatably on the motor housing 11. The slider 38 is displaced to the right by the pressure spring 37 in FIG. 3, so that the locking projection 36 form-lockingly engages in the recess 27 formed by the rib pair 25. For releasing the fixing device 20 for rotating the handle 15, the gripping part 39 is pulled up in direction of the arrow 42 to the position shown in a broken line in FIG. 3. Thereby the slider is displaced to the left in FIG. 3 under tension of the pressure spring 37, and therefore the locking projection 36 is withdrawn from the recess 27. The handle 15 can be turned now by 90° to the left and to the right, and then the grinding disk 14 can assume the position shown in broken lines in FIG. 1. When the handle 15 is turned so that the locking projection 36 no longer coincides with the recess 27, the gripping part 39 can be released. The slider 38 under the spring force of the pressure spring 37 in FIG. 3 is again displaced to the right, and therefore the locking projection 36 is set on one of the ring segments 26. When the handle 15 is turned by 90°, the locking projection 36 slides from the ring segment 26 and is inserted form-lockingly in the recess 27. The handle 15 is automatically locked in the new-rotary position.

For a greater operational safety, the actuating member 21 which in FIG. 2 is the slider 38, is provided with a blocking element 43. The blocking element cooperates with the switch strip 19 so that, when the switch strip 19 is in the switching-on position an actuation of the slider 38, and when the actuating member 21 is actuated for turning the handle 15 a displacement of the switching strip 90 from the switching-off position shown in FIG. 3 to the switching-on position is correspondingly blocked. For this purpose the blocking element 43 is arranged on the upper side of the slider 38 which faces the switch strip 19, preferably of one piece with it to extend in the movement region of the switch strip 19. The switch strip 19 as shown in FIG. 2, is axially displaceable and turnable within some limits by a pin-slot guide 44, while a restoring spring 45 for the return position of the switch strip 19 urges it to the switching-off position. A coulisse guide 46 shown in FIG. 3 is fixed at the side of the handle, and a coulisse pin 47 projecting perpendicularly on the switch strip 19 is guided in the coulisse guide 46. Thereby, the switch strip 19 has a switching-on block and a long running arresting feature. The switch strip 19 must be transferred from the switching-in block in which the coulisse pin 47 is located under the coulisse guide 46 as shown in FIG. 3. The transfer is performed to the long-term arresting by a displacement stroke movement identified with the arrow 48. In the position of the long-term arresting the coulisse pin 46 is located in the coulisse opening 46 above, and the switch strip 19 assumes its position shown in broken lines in FIG. 3. In accordance with the identified arrow 48, the switch strip 19 is first longitudinally displaced in the pin-slot guide 44, then lifted upwardly, and then longitudinally displaced further in the same direction and finally released, so that then it can fixed in the long-term arresting.

In the locking position of the slider 38 shown in FIG. 3, the blocking element 43 assumes the position shown in FIG. 3. When the slider 38 is pulled in direction of the arrow 42, the blocking element 43 is transferred in the locking position of the fixing device 20 to the position shown in broken lines in FIG. 3. When the switch strip 19 is in its switching-off position shown in FIG. 3 in solid lines, then with the pulled gripping part shown in broken lines in FIG. 3 the blocking element 43 is located directly before the end side of the switch strip 19. Thereby a longitudinal displacement of the switch strip 19 is blocked, and the electric drive motor can not be turned-off. When to the contrary the switch strip 19 is located after turning-on of the electric drive motor in its long-term arresting, the switch strip 19 assumes its position shown in broken lines in FIG. 3. In this position the end side of the switch strip 19 is located directly before the blocking element 43 shown in its basic position in FIG. 3 in which the fixing device 20 fixedly connects the handle 15 with the motor housing 11. When for unlocking the fixing device 20 an operator pulls the gripping handle 39, the blocking element 43 abuts against the end side of the switch strip 19 and blocks each displacement of the slider 38 and thereby the unlocking of the fixing device 20.

FIGS. 6 and 7 schematically show two handles 15 with a modified fixing device 20. The actuating member 21 is formed again as a slider 38 which is axially displaceable in the handle 15 and carries again the locking projection 36 on its end. On the other end the slider 38 carries a push button 49 which engages in the handle opening 18 but remains inside the lateral contour of the brackets 17. The pressure spring 37 is supported on the one hand against the slider 38 and on the other hand against the handle 15. It is arranged relative to the locking projection 36 so that during the displacement of the push button 49 into the handle 15, the pressure spring 37 is tensioned and the locking projection 36 is withdrawn from the opening 27 formed by the rib pair 25.

In the fixing device 20 integrated in the handle 15 in FIG. 7, the actuating member 21 includes a two-arm lever 50 which is turnably supported in the handle 15 and carries a lever arm of the locking projection 36 on its end. A displacing button 51 is pivotally connected with another lever end. It is longitudinally displaceably guided in the brackets 17 of the handle 15 by a pin-slot guide 52 and extends in the handle opening 18. A rotary spring 53 is located in the pivot point of the lever 50 and the displacing button 51. It is supported at one hand against the lever 50 and at the other hand against a displacing button 51. The lever 50 is loaded in clockwise direction in FIG. 7, so that the locking projection 36 engages in the recess 27 formed between the rib pairs 25. If the displacing button 51 is displaced to the right in FIG. 7, the lever 50 turns in counter clockwise direction to the position shown in broken lines in FIG. 7, so that the locking projection 36 exits the recess 27 and the fixing device 20 is disengaged. In accordance with another embodiment, the blind hole 23 can be also formed as a throughgoing opening within the idea of the present invention.

It will be understood that each of the elements described above, or two or more together, may also find a useful application in other types of constructions differing from the types described above.

While the invention has been illustrated and described as embodied in hand power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior an, fairly constitute essential characteristics of the generic or specific aspects of this invention.

What is claimed as new and desired to be protected by Letters Patent is set forth in the appended claims:

1. A hand power tool formed as a hand-guided angular grinder, comprising a tool; and an electric-motor drive for said tool; a housing accommodating said drive and carrying a central bearing pin at a side facing away from said tool; a handle composed of two semi-shells and rotatably arranged on said bearing pin, said handle overlapping an end side of said housing and having a switch strip; an electrical switch actuated by said switch strip and connected with said drive by an electrical connecting cable extending through said bearing pin for turning-on and turning-off of said drive; and fixing device for fixing said handle in at least two different positions in a relative rotation to said motor housing and having a manual actuating member arranged on said handle, each of said handle shells being provided with a bearing semi-shell formed on said handle shell and rotatably arranged on said bearing pin, said bearing pin being provided at an end side with a blind hole; and a sleeve inserted in said blind hole and having a radial flange overlapping concentric ends of said bearing pin and said bearing semi-shells, said sleeve having a snapping hook located at an end which is remote from said flange and arrested in radial recesses in said bearing pin.

2. A hand power tool as defined in claim 1, wherein said bearing pin has at least one radial slot which opens into said blind hole, said connecting cable extending through said radial slot and through said sleeve, said sleeve carrying at least one radial projection engaging in said radial sleeve and fixing said connecting cable on a bottom of said radial slot.

3. A hand power tool as defined in claim 2, wherein said blind hole has a bottom, said radial slot extending to said bottom of said blind hole.

4. A hand power tool as defined in claim 1, wherein said fixing device has a locking projection which is movable in said handle and coupled with said actuating member, and at least two recesses formed in said housing for a form-locking receiving said locking projection at least in a circumferential direction of said housing, said arresting projections being offset relative to one another in a circumferential direction; and means for applying a spring force to at least one element selected from the group consisting of said locking projection and said actuating member for engaging said locking projection in an insertion direction into said recesses.

5. A hand power tool as defined in claim 4, wherein said locking projections are offset relative to one another by an identical rotary angle substantially equal to 90°.

6. A hand power tool as defined in claim 4, wherein each of said recesses is formed by two ribs of a rib pair arranged at parallel and at a distance from one another and extending in said motor housing from a periphery of said bearing pin radially outwardly.

7. A hand power tool as defined in claim 6; and further comprising ring segments which are concentric relative to an axis of said bearing pin and connect with one another those of said ribs which are adjacent to one another in a circumferential direction of said motor housing, said ring segments having an axial height corresponding to a height of said ribs, said ring segments being arranged so that said locking projection abuts against them in a rotary region between two rib pairs.

8. A hand power tool as defined in claim 1, wherein said actuating member is located near said switch strip and provided with a blocking element which cooperates with said switch strip so that when said switch strip is brought to a switching-on position, an actuation of said actuating member and when said actuating member is actuated for turning said handle, a bringing of said switching strip from its switching-off position and its switching-on position is blocked.

9. A hand power tool as defined in claim 8, wherein said switching strip has a switching-on block which is liftable by a longitudinal displacement of said switching strip, and a long-term arresting in which said switching strip after switching-on of said electric-motor drive is arrestable, said switching strip and said blocking element being arranged spaciously in one another so that after transferring of said actuating member to its handle-unlocking position said blocking element is located directly before said switching strip to prevent its longitudinal displacement, and after transferring said switch strip to its long-term arresting said switch strip is located directly in front of said blocking element for hindering its displacement.

10. A hand power tool as defined in claim 4, wherein said actuating member is formed as a slider which is guided in said handle, said slider having one end provided with a locking projection and another end which extends outwardly of said handle and carries a gripping part; and further comprising a pressure spring which applies a spring force to said slider and abuts against said slider and said handle.

11. A hand power tool as defined in claim 10, wherein said handle has a bracket overlapping said switching strip with a distance; and further comprising a pressure spring which together with said locking projection are arranged so that for lifting said locking projection from said recesses said slider must be pulled manually and said gripping part for gripping extends over said bracket outwardly at both sides.

12. A hand power tool as defined in claim 10, wherein said handle has a bracket which overlaps said switch strip with a distance, said a pressure spring together with said locking projection being arranged so that for lifting said locking projection from said recesses said slider must be manually displaced, said gripping part being formed as a push button remaining inside a contour of said bracket.

13. A hand power tool as defined in claim 1, wherein said actuating member has a two-arm lever which is turnably supported in said handle with one lever arm carrying said locking projection and a displacing button displaceably supported in said handle, said displacing button having one end pivotably connected with another of said lever arms of said lever and another end extending outwardly beyond said handle; and further comprising a turning spring applying a spring force and abutting against said displacement button and said handle.

* * * * *